United States Patent [19]

Maya

[11] Patent Number: 4,648,951
[45] Date of Patent: Mar. 10, 1987

[54] PHOTOIONIZATION TECHNIQUE TO ENRICH MERCURY ISOTOPES AND APPARATUS THEREFOR

[75] Inventor: Jakob Maya, Brookline, Mass.

[73] Assignee: GTE Products Corporation, Danvers, Mass.

[21] Appl. No.: 552,225

[22] Filed: Nov. 16, 1983

[51] Int. Cl.[4] .................................................. B01J 19/12
[52] U.S. Cl. .......................... 204/157.21; 204/157.22; 250/423 P; 250/424
[58] Field of Search ................ 423/2; 250/423 P, 424; 204/157.1 H, DIG. 11, 157.21, 157.22

[56] References Cited

U.S. PATENT DOCUMENTS

| | | | |
|---|---|---|---|
| 3,673,406 | 6/1972 | Nief et al. | |
| 4,023,038 | 5/1977 | Janes et al. | 250/423 P |
| 4,107,537 | 8/1978 | Forsen et al. | 250/423 P |
| 4,286,152 | 8/1981 | Pugh et al. | 250/423 P X |
| 4,302,676 | 11/1981 | Levin et al. | 423/2 X |
| 4,379,252 | 4/1983 | Work et al. | 313/639 X |

OTHER PUBLICATIONS

Stangeby et al.: "Proposed New Method for Separating Isotopes", Nature, vol. 233, Oct. 15, 1971.

*Primary Examiner*—Richard D. Lovering
*Attorney, Agent, or Firm*—William H. McNeil; Carlo S. Bessone

[57] ABSTRACT

A simple photoionization technique for enriching a particular isotope of mercury in a naturally-occurring mixture employing an isotopically pure radiation source separately optimized for 253.7 nm. and 404.7 nm. emission, respectively. A vessel is provided for containing the naturally occurring mercury. This vessel may be part of either a flow or closed system. The radiation source brings the isotope from the $6^1S_0$ ground state to the $6^3P_1$ state wherein the nitrogen gas deactivates the isotope to bring the isotope to the long-lived $6^3P_0$ state. Thereafter, the source optimized at 404.7 nm. brings the isotope to the $7^3S_1$ state. At this level the atom may be easily photoionized either by a laser or a powerful visible incoherent radiation source.

14 Claims, 4 Drawing Figures

PHOTOIONIZATION TECHNIQUE TO ENRICH MERCURY ISOTOPES AND APPARATUS THEREFOR

TECHNICAL FIELD

The present invention relates to a relatively simple photoionization method and associated apparatus adapted to enrich a predetermined isotope of mercury in a naturally-occurring mercury mixture. The technique of the present invention may be used to enrich any one of the many isotopes of mercury but has particular application in the enrichment of the $^{196}$Hg isotope which has a natural abundance of only about 0.146%.

BACKGROUND ART

Photoionization techniques, in which ionization comes about by the action of radiant energy, have relatively recently come into use, particularly in connection with laser isotope separation. In this regard, reference may be made to U.S. Pat. No. 4,379,252 and articles from "Laser Focus", September 1982 Issue, pps. 49-54 by David, et al of the Lawrence Livermore National Laboratory, and "Photonics Spectra", October, 1982 Issue, pps. 49-66 and entitled "Lasers in Chemistry" by Chen et al. These articles along with other known techniques rely upon the use of a pulsed laser beam for photoionization so as to bring the isotope that is to be enriched from the lowest energy state (ground state), directly to the photoionized state. The present techniques as they relate to the energy level diagram of FIG. 1 herein, teach a transition directly from the ground $6^1S_0$ state to the $6^3P_1$ state, and from there directly to the $7^3S_1$ state and subsequently into an ionized state. However, this requires the use of a relatively high power laser source and makes the entire procedure relatively costly.

DISCLOSURE OF THE INVENTION

Accordingly, one object of the present invention is to provide an improved and relatively simple photoionization technique to enrich isotopes of mercury.

Another object of the present invention is to provide an improved and simple photoionization scheme to enrich a predetermined mercury isotope and in which the technique can be carried out less expensively than prior known techniques.

A further object of the present invention is to provide an improved and simplified photoionization method and associated apparatus for enriching mercury isotopes and in which the photoionization can be carried out with the use of a relatively low power or general purpose laser or an incoherent source rather than requiring the use of a special purpose, large power output laser source.

To accomplish the foregoing and other objects, in one aspect to the invention, there is provided a relatively simple photoionization method and associated apparatus adapted to enrich a predetermined isotope of mercury in naturally-occurring mercury. In accordance with one embodiment of the method of this invention, there are provided the steps of radiating the mercury from an isotopically pure radiation source so as to bring the isotope from the $6^1S_0$ ground state to the $6^3P_1$ state, deactivating the isotope to bring the isotope to the long lived $6^3P_0$ state of mercury using a relatively large molecule inert gas, and radiating the mercury from the aforementioned source to bring the isotope to the $7^3S_1$ state. Finally, a broad band radiation source is used for photoionizing the isotope atom and subsequently there are provided for collection of the predetermined ionic isotope. With regard to the steps of radiating the mercury, there is preferably provided a pair of discharge sources, each filled with pure isotopic mercury and separately optimized for 253.7 nm and 404.7 nm emission, respectively. The first source emitting 253.7 nm radiation brings the isotope from the $6^1S_0$ ground state to the $6^3P_1$ state. The second source emitting 404.7 nm radiation brings the isotope from the $6^3P_0$ state to the $7^3S_1$ state. The $6^3P_1$ state is preferably collisionally deactivated by the preferred gas which is nitrogen. It is the purpose of the present invention to have as large a population of the $6^3P_0$ state as possible. A large quenching inert molecule such as nitrogen is used to accomplish this.

In accordance with one embodiment of the present invention, the apparatus employed in carrying out the photoionization scheme comprises an isotopically pure lamp radiation source means which may comprise a pair of discharge sources such as isotopically pure lamps optimized for 253.7 nm. and 404.7 nm. emission, respectively. A vessel is used for containing a natural mercury mixture. This vessel may be part of a flow or closed system. The deactivating gas which is preferably nitrogen, is preferably at a pressure of about 16-25 TORR to provide optimum production of the $7^3S_1$ state. A powerful optical incoherent radiation source carries out the ionization of the isotope atom to enable collection thereof. For the purposes of collection, this can be carried out by way of negatively charged collection plates in the vessel.

BEST MODE FOR CARRYING OUT THE INVENTION

For a better understanding of the present invention together with other and further objects, advantages and capabilities thereof, reference is made to the following disclosure and appended claims in connection with the above described drawings.

Figure 1:
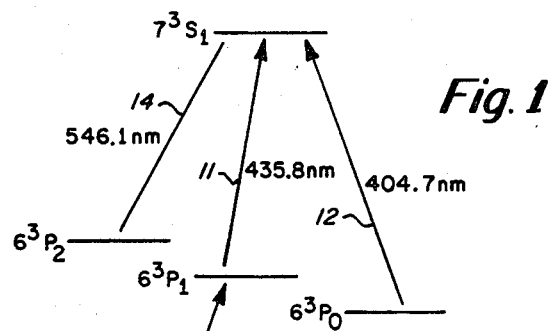
FIG. 1 illustrates an energy level diagram of mercury.

With reference to the drawings, FIG. 1 shows a simplified energy level diagram for mercury that is useful in explaining the concepts of the present invention. The energy level diagram for mercury depicted in FIG. 1 illustrates the different energy states that the mercury atom may assume. The zero or ground state is state $6^1S_0$. By absorption of a first photon, an atom is brought to the higher energy level state which is state $6^3P_1$ as illustrated by the arrow 10. FIG. 1 also illustrates by arrows 11 and 12 the transition from the $6^3P_1$ state and the $6^3P_0$ state, respectively, to the higher order $7^3S_1$ state. The line 14 is un-arrowed to indicate the bidirectional nature thereof in connection with an interchange of energy between states $6^3P_2$ and $7^3S_1$. The manner in which photoionization takes place in is described in conjunction with the energy level diagram of FIG. 1.

In accordance with the photoionization scheme of an embodiment of the invention, there is provided an isotopically pure lamp radiation source which emits radiation at the 253.7 nm region of the electromagnetic spectrum. The radiation sources are described hereinafter. The 253.7 nm radiation is absorbed by only one mercury isotope (corresponding to that of the source) in the $6^1S_0$ ground state. By way of example, the mercury isotope may be the $^{196}Hg$ isotope which is the isotope that appears in the smallest percentage in naturally-occurring mercury. In connection with FIG. 1, the absorption of the first photon brings the particular isotope from the $6^1S_0$ ground state to the $6^3P_1$ state illustrated in FIG. 1. The $6^3P_1$ state is then collisionally deactivated to the $6^3P_0$ state by the use of a relatively inert, large molecule, quenching gas such as nitrogen. Other gases that may be used include CO, $NH_3$ and $NH_2$. Although gases other than nitrogen can be used, it has been found that nitrogen very efficiently deactivates the $6^3P_1$ state to bring the particular isotope to the long-lived $6^3P_0$ state of mercury. FIG. 1 shows the $6^3P_1$ and $6^3P_0$ energy levels. Thus, rather than attempting the transition from the $6^1S_0$ state to the $6^3P_1$ state and from there the $7^3S_1$ state, in accordance with the invention, by means of deactivation with the nitrogen gas, there is a substantial increase in the efficiency of the process with the transition to the $7^3S_1$ state instead being for the most part from the $6^3P_0$ state.

Thus, once in the $6^3P_0$ state, absorption of a second photon at 404.7 nm. emitted by the radiation source takes the atom to the $7^3S_1$ state. Once at this level, the atom may easily be photoionized either by a laser or a powerful visible incoherent radiation source. In connection with the use of a laser, this may be a 469.7 nm laser corresponding to an energy level of 2.64 ev. The function of the second photon (404.7 nm.) is to bring the atom to the range of available radiation sources for photoionization. In the past it has not been possible to efficiently accomplish this photoionization with readily available commercial radiation sources. However, in accordance with the present invention, by means of deactivation to the $6^3P_0$ state, efficient photoionization is now possible. Once the photoionization is completed, the particular ionic isotope (e.g. $^{196}Hg+$) may be collected via negatively charged collection plates or a braised collection wire as will be described in more detail in connection with the apparatus to be described soon.

In accordance with the method of the present invention, it is noted that the absorbing of a 435.8 nm. photon to bring the isotope from the $6^3P_1$ state to the $7^3S_1$ state has a much smaller rate because, in the presence of nitrogen, the density of atoms at the $6^3P_1$ state is expected to be smaller than that at the $6^3P_0$ state. It is noted, however, that this process is additive and enhances the efficiency of enrichment.

Also illustrated in FIG. 1 is the transition line 14 between states $6^3P_2$ and $7^3S_1$. Another process that is likely to take place is spontaneous or stimulated emission of 546.1 nm. radiation into or out of the $7^3S_1$ state. In the presence of the aforementioned gas such as nitrogen, however, the atoms of the $6^3P_2$ state tend to relax to the $6^3P_1$ state at a gas-kinetic rate. This thus makes further $6^3P_1$ state atoms available for further processing. In fact, observation of 546.1 nm. photons may be used for diagnostic purposes to monitor the efficiency of production of the $7^3S_1$ state for photoionization.

Figure 2A:
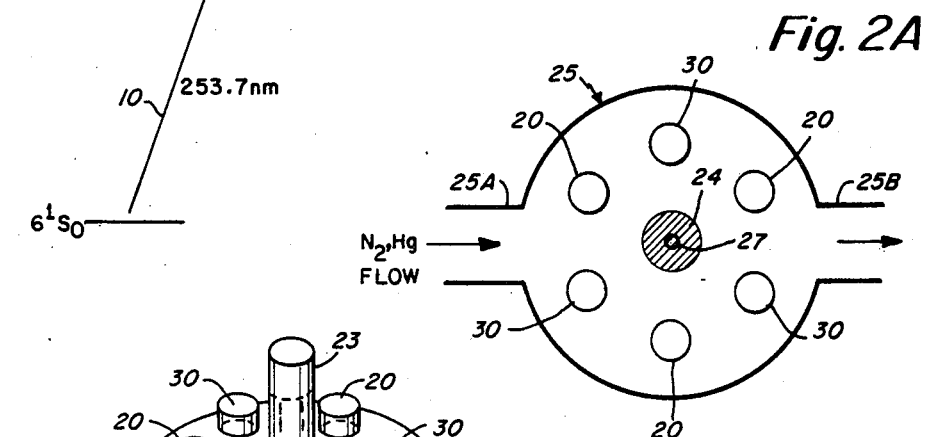
FIGS. 2A and 2B are respective top and side views of a reactor illustrating apparatus used in carrying out the photoionization scheme of the present invention for enriching a particular isotope of mercury in a naturally occurring mixture.
Figure 2B:
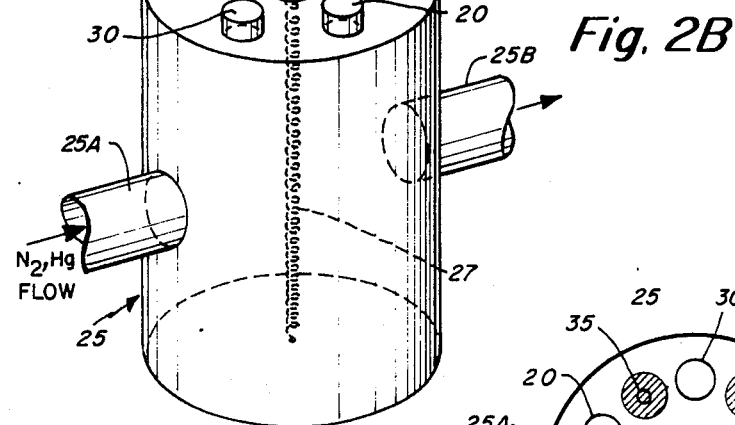

The optical pumping of the natural mercury mixture may be accomplished by means of an electrodeless lamp as the radiation source and which is filled with enriched or pure isotopic mercury and preferably placed coaxially with the mercury containing vessel. Alternatively, a low pressure electroded discharge or hollow cathode or other resonance lamp may also be used. A preferred embodiment for the apparatus of the photoionization separation scheme of the present invention is illustrated in FIGS. 2A and 2B in respective top and side views of a reactor. Although a single isotopically pure lamp may be employed, it is preferred as illustrated in FIGS. 2A and 2B that there be provided a plurality of lamps including a set of first isotopically pure lamps 20 each optimized for a 253.7 nm. radiation output. There is also provided a second set of isotopically pure lamps 30 each optimized for 404.7 nm. radiation output. As illustrated, these lamps are coaxially disposed in the vessel 25 about the biased collection wire 27. When using two different discharge sources as illustrated herein separately optimized for 253.7 nm. and 404.7 nm. emission, respectively, appropriate filtering (not shown) may be desirable. FIGS. 2A and 2B also show the laser source 23 or powerful incoherent visible radiation source. Area 24 in FIG. 2A outlines the ionization radiation zone. The vessel 25 may either be part of a flow or closed system and in the system illustrated, it is part of a closed loop flow system. Note the inlet 25A and outlet 25B associated with vessel 25. The combination of mercury and nitrogen (or other large molecule, relatively inert gas) flows through the vessel 25 in a closed loop manner.

The radiation sources 20 and 30 as well as the vessel 25 can also be provided with separate side arms (not shown) for controlling the temperatures so as to optimize the enrichment efficiency. At a nitrogen pressure of about 16-25 TORR, the production of atoms to the $7^3S_1$ state is optimized.

Figure 3:
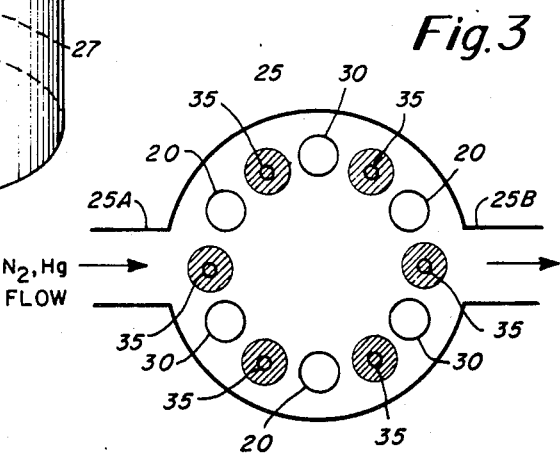
FIG. 3 is a top view of an alternate collection scheme.

FIG. 3 is a top view of an alternate reactor construction having an improved multiple collection wire scheme. In FIG. 3 the same reference characters are used to identify like parts previously illustrated and described in FIG. 2A. Thus, in FIG. 3 there is provided a plurality of lamps including a set of first isotopically pure lamps 20, each optimized for a 253.7 nm radiation output. There is also provided a second set of isotopically pure lamps 30, each optimized for 404.7 nm radiation output. As illustrated, these lamps are coaxially disposed in the vessel 25 and have disposed between each of the lamps, a biased collection wire 35. In the embodiment of FIG. 3, there are six lamps used and thus there are a corresponding number of collection wires 35. As with the embodiment of FIG. 2A, in FIG. 3 there is provided an inlet 25A and an outlet 25B associated with the vessel 25. The combination of mercury and nitrogen flows through the vessel 25 preferably in a closed loop manner.

One of the advantages of the particular structure of FIG. 3 is that by means of the multiple collection wires for ionization of the excited atoms, one avoids deterioration of the excited state population that is ready to be ionized. The shorter the distance that the excited state atoms ($7^3S_1$ state) have to travel in order to get into the beam of the ionization radiation, the greater the efficiency of separation. By the same token, the shorter the distance the ionic isotopes have to travel in order to be collected, the less the possibility of charge exchange and scrambling collisions; hence multiple collection wires provide this improved operation.

As mentioned previously, a single isotopically pure lamp may be employed although it is preferred to have the dual lamp arrangement illustrated herein. In the embodiment in which one lamp is used, this lamp could be used for both 253.7 nm and 404.7 nm radiation. However, by using two lamps of different characteristics, namely optimized for 253.7 nm and 404.7 nm radiation, one increases the overall efficiency of the technique. For example, a lamp can be optimized at about 55% efficiency at 253.7 nm radiation; at which point efficiency of the 4.407 nm radiation is on the order of only a few percent. However, with the use of a separate lamp, the process is optimized at about 10–15% efficiency for 404.7 nm radiation; at what point efficiency of the 253.7 nm radiation is at a maximum on the order of about 30%.

With respect to the ionizing source, as mentioned previously, this may either be in the form of a laser or a powerful visible incoherent radiation source. It is desired to have enough photons/cm$^2$ (i.e. photonflux) at the appropriate wavelength region. In this regard the laser has the advantage of emitting all of its energy at a particular wavelength in a narrow beam, although at relatively low efficiency. On the other hand the incoherent source such as a 400–1000 watt metal halide or high pressure xenon or high pressure mercury source, for example, has the advantage of emitting photons at higher efficiency over a larger bandwidth but spatially distributed over 360°. Therefore, generally speaking, one would have to use reflectors and optics to focus these photons down the collecting wire to obtain large photonflux. The 469.7 nm radiation is the minimum energy required to accomplish the ionization. Since ionization is basically a continuum, however, shorter wavelengths may also be used. Therefore, an incoherent source that contains substantial radiation in the 350–500 nm region has an advantage since all radiation would in substance be used for ionization.

While there have been shown and described what are at present considered the preferred embodiments of the invention, it will be obvious to those skilled in the art that various changes and modifications may be made therein without departing from the scope of the invention as defined by the appended claims.

I claim:

1. A method of photoionizing naturally-occurring mercury to enrich a predetermined isotope of mercury comprising the steps of: radiating the mercury from an isotopically pure lamp radiation source so as to bring the isotope from the $6^1S_0$ ground state to the $6^3P_1$ state, deactivating the isotope to bring the isotope to the long lived $6^3P_0$ state of mercury using a relatively large inert quenching molecule, radiating the mercury from said source to bring the isotope to the $7^3S_1$ state, photoionizing the isotope atom by means of a powerful optical incoherent radiation source, and collecting the predetermined ionic isotope.

2. A method as set forth in claim 1 wherein the mercury is radiated from a first source emitting 253.7 nm. radiation to bring the isotope from the $6^1S_0$ ground state to the $6^3P_1$ state.

3. A method as set forth in claim 2 wherein the mercury is radiated from a second source emitting 404.7 nm. radiation to bring the isotope from the $6^3P_0$ state to the $7^3S_1$ state.

4. A method as set forth in claim 3 wherein the mercury isotope is deactivated by nitrogen.

5. A method as set forth in claim 4 wherein the collecting step includes applying a biasing charge.

6. Apparatus for photoionizing naturally-occurring mercury to enrich a predetermined isotope of mercury comprising: an isotopically pure lamp radiation source means having radiation means for bringing the isotope from the $6^1S_0$ ground state to the $6^3P_1$ state, a vessel for containing the naturally-occurring mercury, a relatively large inert quenching molecule means feeding gas to the vessel to deactivate the isotope to bring the isotope to the long-lived $6^3P_0$ state, said source means further having means for bringing the isotope from the $6^3P_0$ state to the $7^3S_1$ state, and a powerful optical incoherent radiation source for photoionizing the isotope atom to enable collection thereof.

7. Apparatus as set forth in claim 6 wherein said radiation source means comprises a first source emitting 253.7 nm. radiation to bring the isotope from the $6^1S_0$ ground state to the $6^3P_1$ state.

8. Apparatus as set forth in claim 7 wherein said radiation source means further comprises a second source emitting 404.7 nm. radiation to bring the isotope from the $6^3P_0$ state to the $7^3S_1$ state.

9. Apparatus as set forth in claim 6 wherein said vessel comprises part of a flow system.

10. Apparatus as set forth in claim 6 wherein said vessel comprises part of a closed system.

11. Apparatus as set forth in claim 6 including means for collecting the predetermined ionic isotope.

12. Apparatus as set forth in claim 11 wherein said means for collecting comprises negatively charged collection plates associated with said vessel.

13. Apparatus as set forth in claim 11 wherein said means for collecting comprises a biased collection wire.

14. Apparatus as set forth in claim 11 including a set of first lamp sources and a set of second lamp sources alternately disposed in a circumferential focus.

* * * * *